Inventors
W. F. Aller
L. J. Mahlmeister
By Edward T. Noé Jr.
Attorney

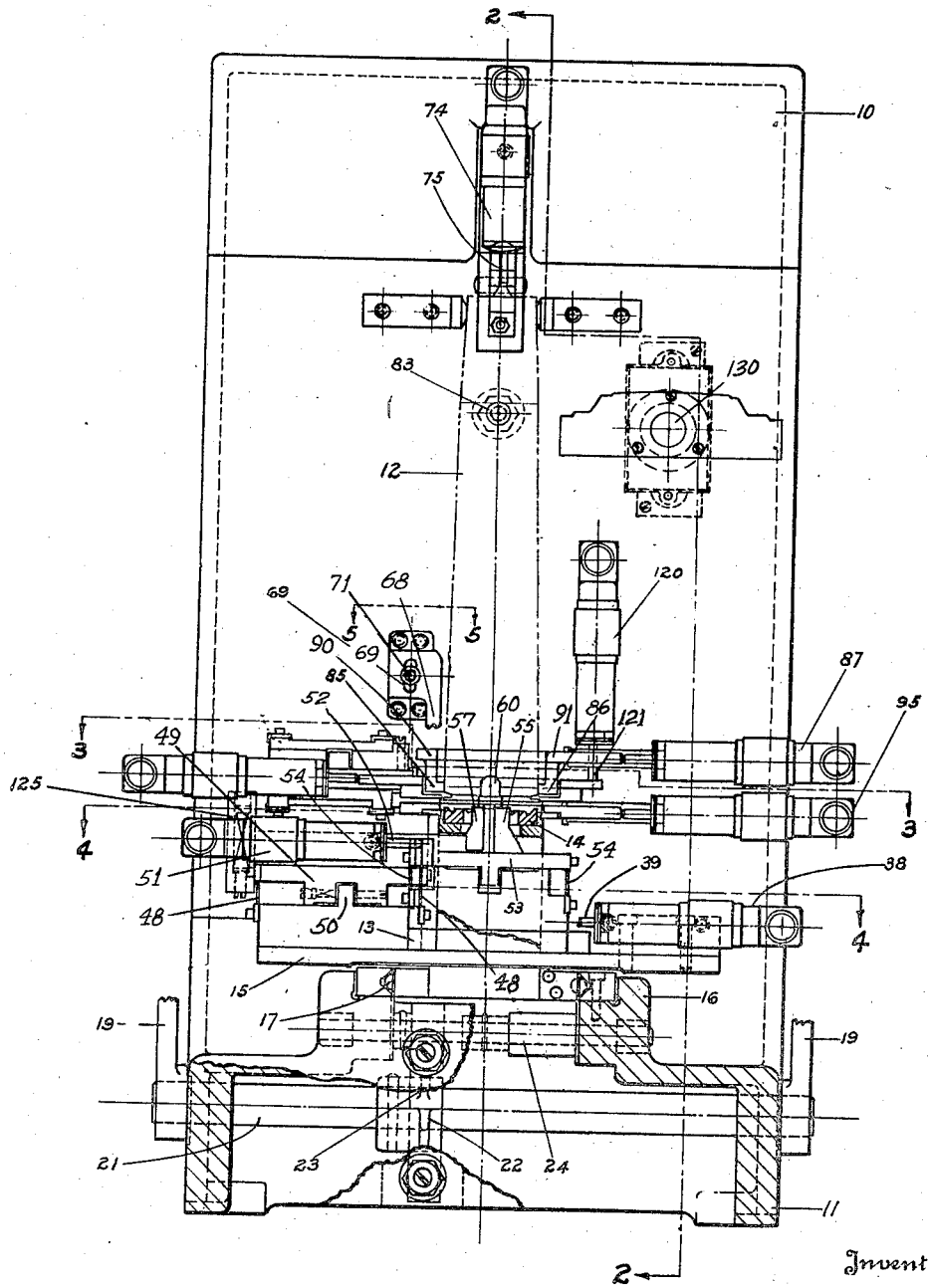

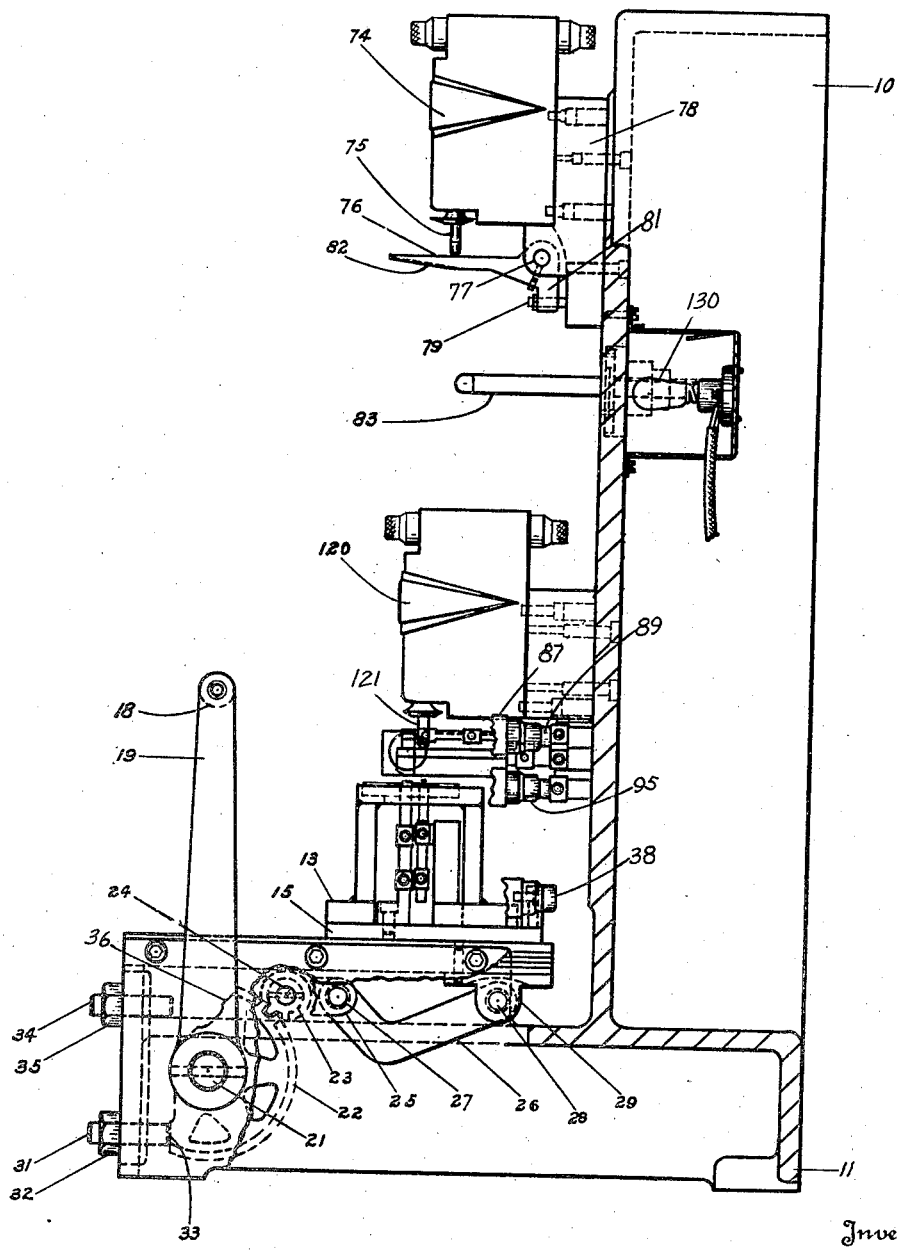

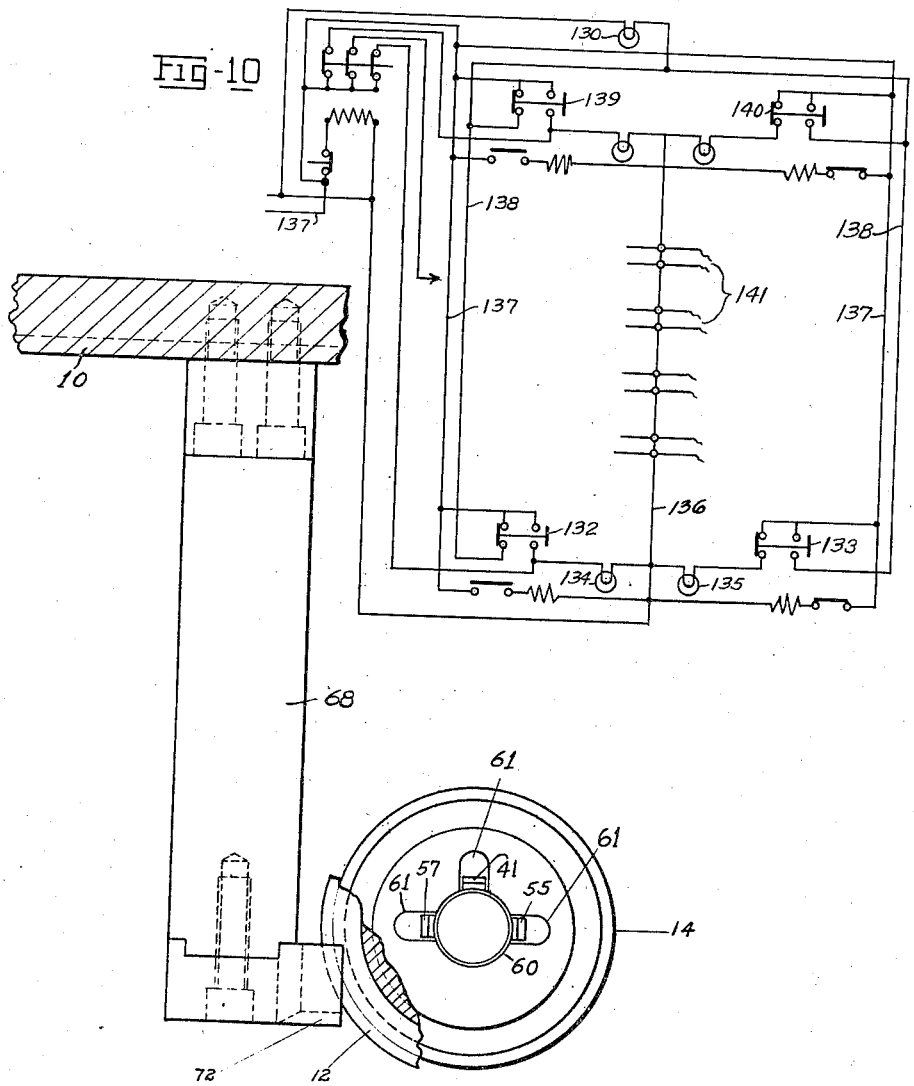

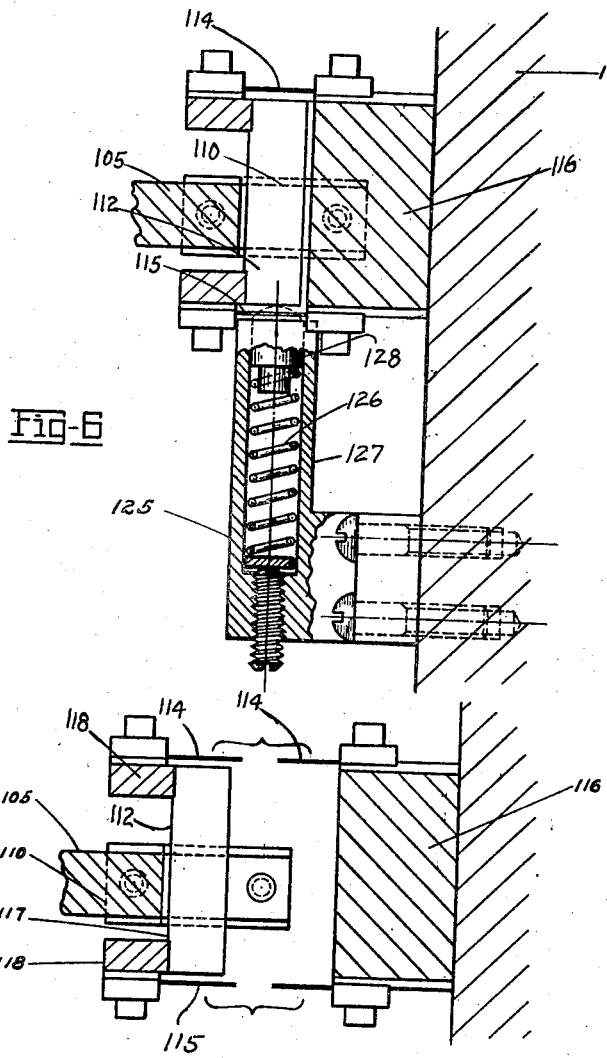

July 16, 1946.　　　W. F. ALLER ET AL　　　2,403,898
GAUGING DEVICE
Original Filed July 3, 1942　　6 Sheets-Sheet 6

Patented July 16, 1946

2,403,898

UNITED STATES PATENT OFFICE 2,403,898

GAUGING DEVICE

Willis Fay Aller and Louis J. Mahlmeister, Dayton, Ohio, assignors to The Sheffield Corporation, Dayton, Ohio, a corporation of Ohio Original application July 3, 1942, Serial No. 449,568. Divided and this application December 27, 1943, Serial No. 515,694

6 Claims. (Cl. 33—174)

This invention relates to measuring or gauging apparatus for accurately gauging sizes of a measured part, present application being a division of our U. S. application, Serial No. 449,568, filed July 3, 1942.

One object of the invention is the provision of a gauging apparatus adapted to simultaneously gauge or compare a large number of different dimensions radially and axially of a workpiece, with the various work contacting and gauging parts compactly arranged.

Another object is the provision of a gauging apparatus including a work holder, for positioning the work, and arranged for movement from a work receiving to a work gauging position, there being provision to prevent movement of the work into such gauging position when the work is not properly positioned on the holder, thus preventing injury to the work gauging fingers and the parts controlled thereby.

Another object is the provision of a gauging apparatus including a support on which a gauging device or devices are arranged, and a work holder for receiving the work and for moving the work into gauging position, the work holder being operable by a mechanism which inherently functions to gradually decelerate the motion of the work holder in moving into gauging position so that the final movement of the work holder is accomplished without shock or jar.

Another object is the provision of a gauging apparatus of the character just mentioned in which the work holder is moved by a toggle linkage that gradually decelerates the movement of the work holder, with cooperating stop means adjustable to accurately determine the final position of the work in gauging position.

Other objects and advantages of the invention will be apparent from the following description, the appended claims and the accompanying drawings.

In the drawings, in which the same reference characters have been applied to like parts in the several views:

Fig. 1 is a front elevation, with some parts shown in vertical section, of a gauging apparatus embodying the present invention;

Fig. 2 is a side elevation, partly in vertical section, on the line 2—2 of Fig. 1, of the gauging apparatus;

Fig. 5 is a horizontal section on the line 5—5 of Fig. 1;

Fig. 6 is a vertical section on the line 6—6 of Fig. 3;

Fig. 7 is a view corresponding to Fig. 6 but showing the spring supported carrier separated from the stationary block on the support;

Fig. 10 is a diagrammatic showing of the connections to a common indicating lamp.

Referring more particularly to the drawings, in which a preferred form of the invention has been shown as embodied in a gauging apparatus for simultaneously gauging or comparing a large number of dimensions of a shell or other workpiece the gauging apparatus comprises a suitable support 10 which projects upwardly from a stationary base 11. A number of gauging devices are arranged on the support, as will be more fully described, for cooperation with the workpiece when the latter is moved into gauging position. It will be understood that the workpiece may take any one of a large number of different shapes or forms, although the invention as herein described and illustrated in a form particularly adapted for gauging internal and external measurements of an elongated work-piece such as a shell. While the term shell will be used in the specification to designate the workpiece, that term designates any other workpiece that may be gauged or measured.

Figure 3:
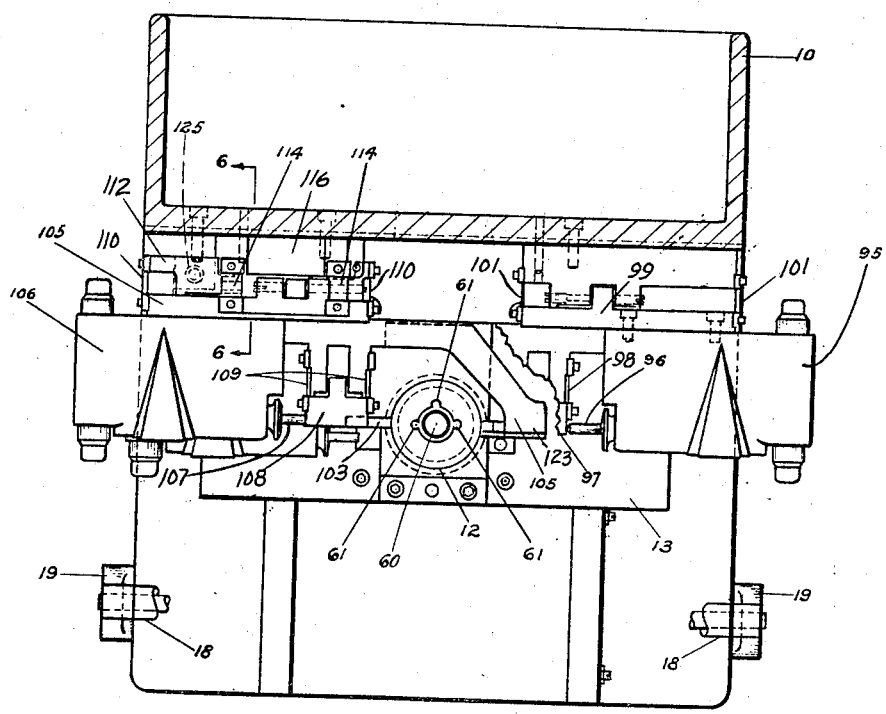
Fig. 3 is a horizontal section on the line 3—3 of Fig. 1.

The shell, designated 12, may be applied to a holder 13 so that the end of the shell rests on the plate portion 14 carried by a table 15 which is horizontally slidable along tracks or ways 16. Suitable anti-friction bearing members 17, preferably ball bearings, are interposed between the tracks 16 and the table 15 so that the table is movable from a position somewhat remote from the support 10, where the shell can be readily applied to the holder, into the position shown in Figs. 2 and 3, in which the shell is in position for cooperation with the gauging devices carried by the support. The work holder can be moved towards the left as viewed in Fig. 2, to move the work away from the support, by pulling the rod 18 carried by a pair of levers 19 which are secured at their lower ends to a control shaft 21, journalled in the side walls of the base. Fixed to the shaft 21 is a gear segment 22 which operates a gear 23 carried by shaft 24 which is also journalled in the side walls of the base 11. The gear 23 is fixed to a link 25 of a toggle linkage including an angular link 26, pivotally interconnected to link 25 at 27. The other end of the link 26 is pivoted at 28 to an ear 29 which is fixed to and projects down from the table 15. When the work holder is arranged in its operative or gauging position as indicated in Fig. 2, the pivot connection 27 between links 25 and 26 is almost in alignment with the shaft 24 and the pivot axis 28. By pulling the rod 18 towards the left as viewed in Fig. 2, the gear 23 is rotated clockwise, swinging the link 25 clockwise about 180°, and consequently pulling the table 15 out of its gauging position and into the withdrawn position in which the shell can be readily applied to or removed from the holder. The angular form of the link 26 is such that the three pivot points of the toggle linkage will be substantially in alignment, when the table has been moved out, the recessed part of the link 26 then being close to or in contact with the lower side of the shaft 24. With this arrangement it will be clear that the motion of the table 15 is gradually decelerated at both ends of its movements either towards or from the support 10, the final movements of the table being very gradual, thus bringing the table to a determined position without shock or jar to any of the parts. The final position to which the table is brought, near the support 10, is accurately determined by an adjustable screw 31, held in any adjusted position by a lock nut 32 in the front wall of the base 11, contacting with a stop surface 33 on the gear segment 22 to stop the clockwise movement of the levers 19 and stop the movement of the table 15 in the exact position desired, with the shell centered in position for proper engagement with the gauging devices on the support. The stop screw 31 is preferably so arranged that it contacts with the stop surface 33 just before the toggle linkage is fully straightened. A similar stop screw 34 and lock nut 35 is provided for engagement with a stop surface 36 on the gear segment 22 to limit the outer movement of the table 15 so that the link 26 will not be brought forcibly against the shaft 24.

Figure 4:
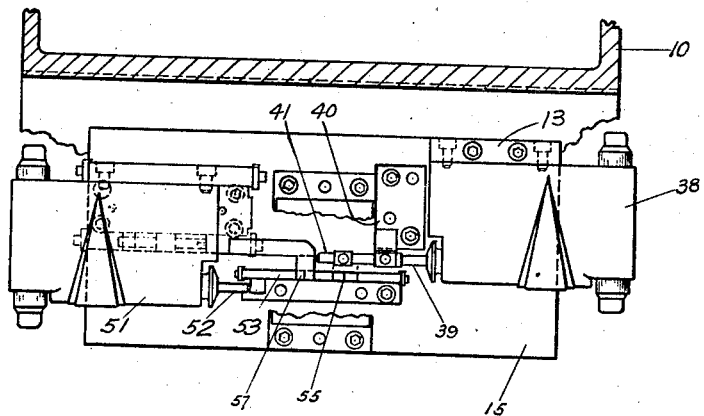
Fig. 4 is a horizontal section on the line 4—4 of Fig. 1.
Figure 8:
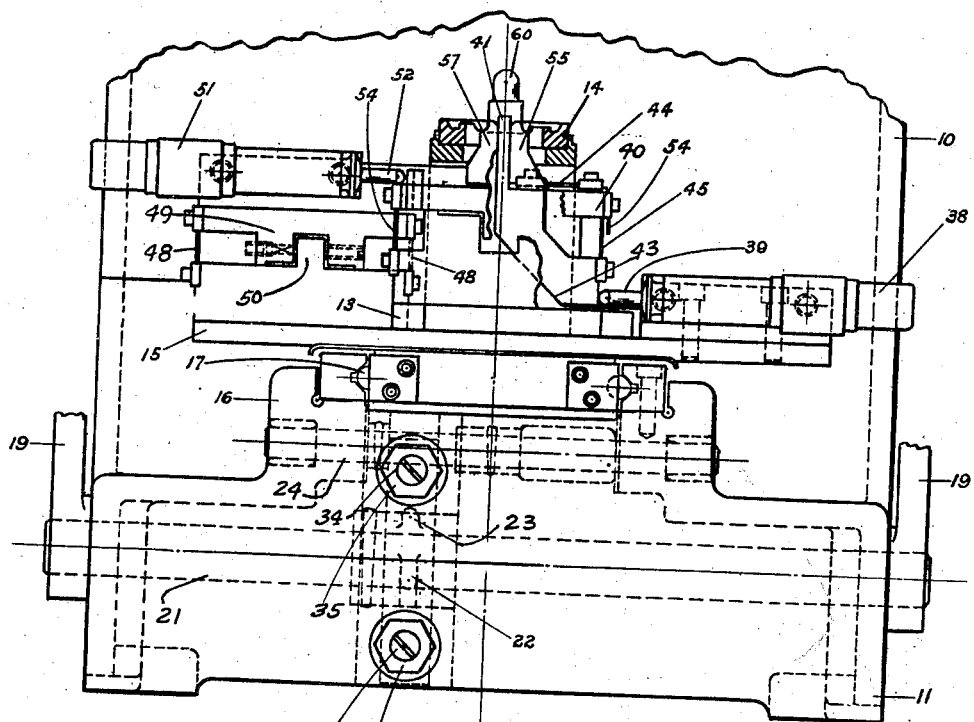
Fig. 8 is a front elevation, partly in vertical section, showing the work holder and the gauging devices carried thereby.

The table 15 supports a plurality of gauging devices which gauge or compare radial and axial dimensions of the shell. One of these gauging devices includes a gauge head 38 (see Figs. 1, 4 and 8) secured on the table 15 and having a plunger or operating element 39 which is controlled by motion transmitting mechanism in accordance with the position of a work contacting finger 41 which is vertically movable and engageable with an internal shoulder 42 of the shell 12. The finger 41 is fixed to and projects upwardly from a block 43 which is supported by spring blades 44 and 45 of equal length and arranged 90° to one another. The adjacent ends of these spring blades are fixed to a portion 49 forming part of or fixed to the table 15. The block 43, in effect, is thus pivoted for small movements about an axis which substantially corresponds to the point of intersection of the spring blades 44 and 45. Thus the vertical movements of the finger 41 are transformed into equal horizontal movements of the portion of block 43 which contacts with the operating element 39 of the gauge head. Normally, before the work is applied, the finger 41 is held by the spring blades 44 and 45 and by the operating element 39 slightly above the position to which the finger is depressed when the shell is applied to the plate 14, and when the work is in position the spring blades 44 and 45 are straight if the dimension gauged is of the required size. The gauge head 38 is of a suitable character preferably like the gauge head illustrated in Patent No. 2,254,812 granted September 2, 1941, and is connected electrically in a manner similar to that disclosed in the mentioned patent to suitable indicating means which enable the operator to see whether or not the part gauged is of the required size.

Figure 9:
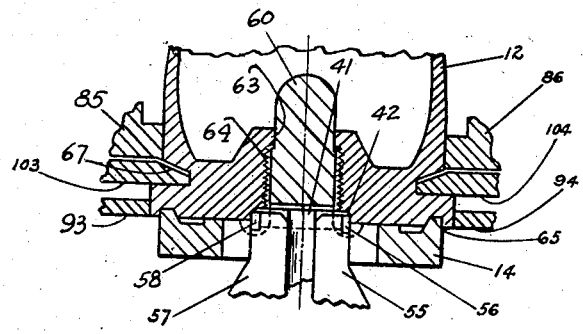
Fig. 9 is a central vertical section through the lower portion of a workpiece, showing its cooperative association with a number of the work contacting portions of the gauging apparatus.

Mounted on the table 15 by means of a pair of vertical parallel spaced spring blades 48 is a block 49 adapted for limited substantially horizontal movement with respect to the table. An upward extension 50 of the table (see Fig. 1) is received in a recess slightly larger than the extension 50 and provided in block 49 to limit the horizontal travel of the latter. The block 49 is fixed to and supports a gauging device 51 similar to the gauging device 38 in its internal construction. It incorporates an operating element or plunger 52 (see Figs. 1 and 4) which is engaged and operated by a bar 53. The latter is mounted for limited substantially horizontal movement on the table 15 by means of a pair of spaced parallel spring blades 54. On this bar is fixed an upwardly extending arm 55 having a work contacting portion 56 which is engageable with the internal cylindrical surface adjacent the bottom of the shell as shown in Fig. 9. The arm 55 is thus carried for substantially horizontal yielding movement so as to position the operating member 52 of the gauging device in accordance with the size of the internal cylindrical surface adjacent the bottom of the shell. The gauging device 51 is also yieldingly carried by its own supporting spring blades, and is fixed to a second arm 57 having a work contacting portion 58 arranged diametrically opposite the arm 55 and thus adapted to position the housing of the gauging device in a yielding manner, in accordance with the diameter of the surface gauged. The two arms 55 and 57 thus cooperate with the gauging device to give an accurate measurement or comparison with a part of standard size, it being understood that the gauging device is connected to and controls a suitable indicating mechanism in the same manner as described in Patent No. 2,254,812 previously mentioned.

The plate 14, which carries the shell, is provided with a plug 60 which enters the passage in the lower end of the shell when the shell is applied to the plate, if the passage is sufficiently large. The plug may be formed as a part of the plate 14, the latter having recesses 61 arranged generally radially as shown in Fig. 5, to accommodate the upwardly extending arms 55 and 57 and the upwardly extending work contacting finger 41. The upper portion of the plug 60 is of somewhat smaller diameter than the lower portion and serves as a "go" plug for entering the cylindrical internal surface 63 of the shell, if that surface is of sufficient diameter. Below surface 63 the shell is provided with internal threads 64, and the inside diameter of the threads is gauged by the lower portion of the plug 60, which is of such a diameter that it will enter the threaded portion of the shell if the internal diameter of the threads is large enough. If either the surface 63 of the shell or the internal diameter of the threads is too small, the shell will not pass over the plug 60 to rest on the plate 14, and the shell will therefore project up too high, and this will be determined, as will be presently described, by gauging means provided on the support 10 after the work is moved to gauging position.

The plate 14 is also provided with a plug portion that enters the groove 65 at the end of the shell, to determine whether or not the internal diameter of the outer surface forming this groove is large enough. If this diameter is too small on the shell, the latter will not seat on the plate 14. The upper and lower "go" plug portions of the central plug and the upwardly extending "go" plug at the periphery of the plate 14 thus check three internal diameters to determine if they are large enough. At the same time a diametrical measurement or comparison and an axial measurement or comparison is provided for by means of the gauging devices 38 and 51. If the work is properly positioned on the plate 14, that is if the plug portions fully enter the shell, the measurements or indications on the indicating means will show whether or not the gauged portions of the work are of desired size and whether or not their dimension is too large or too small, as soon as the work is positioned on the holder and even before it is moved into gauging position for cooperation with additional gauging devices on the support.

When the shell is moved, by moving the holder back towards the support 10, to its gauging position, the shell is carried past a stop arm 68, fixed on the support 10 and arranged to enter and pass through the groove 67 of the shell if the shell is properly seated on the plate 14. This arm 68, as shown in Figs. 1 and 5, is adjustably fixed on the support by means of a slotted opening 69 in the arm and a bolt 71 which passes through the slot and which is threaded in the support 10, to permit vertical adjustment of the arm. The arm extends downwardly and then projects out towards the front of the apparatus, as shown in Fig. 5, its projecting end having the stop surface 72 which is narrow enough in a vertical direction so that the groove 67 in the shell can receive the stop surface without contacting with it, as the shell is moved into gauging position, illustrated in Fig. 5. However if the shell is not properly seated on the upper surface of the plate 14 because one of the surfaces gauged by one of the plug portions is too small in diameter, then the wider portion of the shell below the groove 67 will contact with the stop 72, thus preventing the shell from being moved into gauging position.

The support 10 carries a gauging device 74 having an operating element 75 which bears against a lever 76 pivotally carried at 77 on a stationary block 78 fixed to the support, shown in Fig. 2. An adjustable stop screw 79 threaded in a downwardly extending leg 81 of the arm 76 limits the counter-clockwise movement of the arm, which is normally urged in this counter-clockwise direction in a yielding manner by the internal mechanism of the gauging head. The lower side of the outer end of the arm 76 provides a cam surface 82 which is engaged by the upper end of the shell when the shell is moved to gauging position. The upper end of the shell thus rides along the cam surface 82 and forces the lever 76 upwardly, or clockwise, to a degree determined by the total height of the shell, and if the shell is of the desired height, the indications produced by the gauging head 74 will so indicate, or will indicate whether or not the height is too much or too little. If the plug portions at the lower end of the shell when the latter is applied to the plate 14 do not permit the shell to seat properly on the plate 14 the arm 76 will be moved upwardly when the shell is moved to gauging position, and give an indication that the height of the shell is excessive.

When the shell is moved into gauging position, the operator holds the shell down on the plate 14, keeping it substantially upright, and the final position of this shell so far as its vertical attitude is concerned, is determined by a stop arm 83 which projects out from the support 10 into a position where it engages the rear of the shell between its upper and lower ends.

When the work holder is moved to gauging position, together with the shell properly in place, the external diameter of the shell just above the groove 67 is determined by work engaging fingers 85 and 86, which control a gauging device 87 mounted on the support 10. This gauging device 87 and the arm 90 which carries the work contacting portion 85 is mounted as a unit for limited horizontal movement towards the right and left as viewed in Fig. 1 by means of a pair of horizontally extending parallel spring blades 89 connected thereto and connected to the support 10. The work contacting portion 86 is mounted on a second arm 91 which bears against the operating element of the gauge head 87, this portion 86 being supported by a pair of parallel spring blades connected thereto and connected to the arm 90 and providing for yielding limited movement in a horizontal direction. An accurate indication is thus obtained on the gauging device even if the work is not exactly centered with respect to the table. The manner in which the arms 90 and 91 are supported from the support 10 is generally similar to the arrangement described in Patent No. 2,254,812 before mentioned.

The external diameter at the lower end of the shell is gauged or compared by means of work contacting elements 93 and 94 which control the indications of the gauging device 95. The operating element 96 of this gauging device bears against a block 97 carried by spring blades 98 which are fixed at one end and to the bar 99 and which mount the block 97 for limited horizontal movement. This block carries the work engaging portion 94. The bar 99 carries the work engaging portion 93 which engages the opposite side of the work at a point diametrically opposite to portion 94. The bar 99 is carried by a pair of parallel spring blades 101 so that the gauge head 95 is supported for yielding movement, to a limited extent, in a horizontal direction.

The diameter of the groove 67 (see Figs. 3 and 9) is measured or compared by a pair of work contacting members 103 and 104 which bear, at their inner ends, against the cylindrical surface forming the inside of the groove. The diameter of this cylindrical surface thus controls the radial relative spacing of these members 103 and 104. Member 104 is carried by the bar 105 which also forms a support for the gauging device 106. The latter is provided with an operating member 107 controlled by a block 108 which carries the work contacting member 103. Block 108 is mounted by a pair of parallel spring blades 109 on the bar 105. The bar 105 is carried by a pair of parallel spring blades 110 which project toward the support 10 and which mount the bar 105 and the gauging device 106 for limited horizontal movement towards the right and left as viewed in Fig. 3. The rear ends of the spring blades 110 are secured to a carrier 112. As will now be understood, the gauging device 106 properly indicates or compares the diameter of the external cylindrical surface at the groove 67 regardless of any slight mis-positioning of the axis of the shell with respect to its intended centered position on the plate 14.

The work engaging portions 103 and 104 are not only mounted for movement in a horizontal plane for gauging a diametrical measurement of the shell, but are also adapted for vertical movement to gauge or compare an axial dimension of the shell at the same time. As will be apparent from Fig. 9, the lower surfaces of these work engaging portions 103 and 104 engage the lower side of the groove 67. To accommodate this up and down movement of these work engaging portions, the entire bar 105, and the gauging device 106 as well are mounted for yielding vertical movement by means of another set of parallel spring blades 114 and 115 (see Figs. 3, 6 and 7). At one end, these spring blades 114 and 115 are secured to a stationary supporting block 116 on the support 10, and at their outer ends they are secured to the carrier 112 to mount the carrier for vertical limited movement. This carrier in turn supports the bar 105 by means of the spring blades 110 as previously described. The carrier 112 comprises a bar portion 117 having integral outwardly extending lugs 118 to which the ends of the springs 114 and 115 are secured, these lugs 118 overhanging the upper and lower portions of the bar 105 as shown in Figs. 6 and 7 so that the bar 105 is mounted for both vertical and horizontal yielding movement, each movement in one direction being without effect so far as movement in the other direction is concerned.

The up and down movement of the bar 105 is transferred to a gauge head 102, by means of the operating member 121 of the gauge head, this operating member extending with suitable clearance through a hole provided in the arm 99 and engaging a flat surface 123 on the arm 105. The operating member 121 of this gauging device thus yieldingly maintains itself in contact with the surface 123, and as the arm 105 is moved upwardly by the work, when the work is brought into engagement with the groove engaging portions, the indicator of the gauging device 120 shows whether or not the horizontally extending surface of the groove, at the lower portion of the groove, is the proper distance from the bottom of the shell. The horizontal movement of the arm 105 and the gauging device 106 which it carries is without effect on the gauging device 120 and, similarly, the up and down movement of the arm 105, which operates the gauging device 120, is without effect on the indications produced by the gauging device 106.

The weight of the gauging device 106, the arm 105, and the other associated parts mounted on the members mentioned is counterbalanced by a spring counterbalance structure generally designated 125. This counterbalance comprises a spring 126 held in a casing 127 which is fixed to the support 119, the upper end of the spring bearing against a plunger 128 which bears against the lower side of the carrier 112 with sufficient force to yieldingly hold the carrier 112 approximately in its normal position so as to relieve the bending strain that would otherwise be applied to the spring blades 110. The normal position of the carrier 112, before the work is brought into engagement with the work contacting portions 103 and 104, is just slightly below the position the carrier is moved to if the work is of a desired size so far as the location of the lower side of the groove 67 is concerned.

As previously indicated, the several gauging heads control electric circuits, each gauging head having an indicating light so that the operator can determine whether any particular gauging head is properly indicating a desired dimension or whether the dimension gauged or compared is oversize or undersize, in the same manner as in the Patent No. 2,254,812, and if all the dimensions checked conform to a desired size standard or predetermined tolerance or tolerances, an indicator light 130 mounted on the support 10 shows the operator that all dimensions checked conform to the desired sizes. If the indicator 130 does not show all dimensions to be proper, the operator can then refer to the individual indicating lamps associated with the individual gauge heads, to see which measurements depart from a desired size, and whether the work gauged thereby is too large or too small.

Fig. 10 illustrates diagrammatically how the several gauging heads may be electrically connected to the common indicating lamp 130. The switches which are controlled by the gauging head 38 are shown at 132 and 133, each cooperating with individual indicating lamps 134 and 135 respectively. The arrangement is such that when both lamps 134 and 135 are electrically connected from the common wire 136 to the supply source 137, both of these lamps will be energized indicating a normal or acceptable size condition. If only one of these lamps is energized, the switch for the deenergized lamp will electrically connect the source lead 137 to a common return line 138 leading to the lamp 130. The switches controlled by the gauging head 87 are indicated at 139 and 140, and additional switches, one for each of the additional heads of the gauging device, are similarly connected at the locations 141. The various switches for the different gauging heads are similarly connected, and when any switch is open in a gauging operation, the lamp 130 will be energized because of the parallel connections to that lamp.

While some of the dimensions are gauged or compared with a part of the desired dimensions as soon as the work is applied to the holder, and before the holder is moved into gauging position, the preferred manner of gauging or comparing a shell is for the operator to apply the shell on the holder, then swing the bar 18 upwardly to bring the holder and the shell into gauging position as exactly predetermined by previously setting the stop 31 which limits the travel of the gear segment 27. As the operator moves the bar upwardly, he holds the upper portion of the shell so that it is moved back and maintains a substantially vertical attitude on the holder. After bringing the holder back into gauging position, the operator then merely needs to look at the indicator light 130 which is conveniently positioned adjacent the work itself, to see whether that light indicates that all sizes checked conform to a desired size standard. If so he knows the work is properly made and that the shell conforms to the desired size standard at all the gauged or checked portions. If the indicator light 130 does not show all sizes to be proper, the operator can then refer to the individual indicating lights, individual to the several gauging devices, to see which measurement gauged departs from a desired size standard or if several dimensions do not conform to the desired size standard he can determine which ones are incorrect. It will be quite apparent, in view of the preceding discussion, that a large number of different measurements in both axial and diametrical directions can be obtained in one operation, and that the successive gauging of successive shells can be very expeditiously accomplished.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. Gauging apparatus comprising a support, a work holder movably carried by said support for operation to and from loading and work gauging positions, means for operating said work holder, gauging means carried by said support and including a gauging element adapted to be received in a groove of the work, and stop means adjacent said element and adapted to enter and be by-passed by such groove if the work is properly mounted on the work holder and blocking the work from gauging position if the work is above a normal position on the work holder.

2. Gauging apparatus comprising a support, a work holder movably carried by said support for operation to and from loading and work gauging positions, gauging means carried by said support and including work contacting portions with which the work is moved into engagement, a hand operated member, and means including toggle arms operated by said hand operated member into approximately aligned position to move the work holder into work gauging position.

3. Gauging apparatus comprising a support, a work holder movably carried by said support for operation to and from loading and work gauging positions, gauging means carried by said support and including work contacting portions with which the work is moved into engagement, a hand operated member, and means including toggle arms operated by said hand operated member into approximately aligned position to move the work holder into work gauging position, and adjustable means for determining the relative position of said arms to locate the holder accurately in work gauging position.

4. Gauging apparatus comprising a support, a work holder on said support and incorporating a plug portion insertable into the work and a plate portion carrying the work, lever and link mechanism for moving the holder to gauging position, a work contacting finger engageable with an internal surface of the work, gauging means carried by the work holder and operated by said finger, gauging means on said support and engaging the work when moved to gauging position, and stop means fixed on said support adapted to enter and be by-passed by a groove in the work if the work is properly mounted on the plate portion and blocking the work from gauging position if the work is above a normal position on the work holder.

5. Gauging apparatus comprising a support, a work holder movably carried on said support for movement into and out of gauging position, said work holder comprising a plate portion for carrying the work and a plug portion insertable into the work, a work contacting finger engageable with an internal surface of the work, gauging means carried by the work holder and operated by said finger, means for moving the work holder into and out of gauging position, means carried by said support for gauging an outer surface on the work when the work holder is in gauging position, and a stop member carried by said support and normally receivable in a groove in the work when the work is properly entered by said plug portion and adapted to block the work from movement into gauging position if the work is held up by said plug portion.

6. Gauging apparatus comprising a support, a work holder operably carried by said support for moving into and out of gauging position, mechanism for moving said holder, gauging devices on said support and operated by a workpiece on said holder when the holder is moved into gauging position, a work contacting gauging device movably carried by the holder and operated by the workpiece when applied thereto, positioning means to locate the work holder accurately in work gauging position, and a common indicator means on said support controlled by all said gauging devices to show when all said gauging devices are positioned in accordance with predetermined sizes of different parts of the workpiece.

WILLIS FAY ALLER.
LOUIS J. MAHLMEISTER.